(12) United States Patent
Stockstill

(10) Patent No.: US 6,761,505 B2
(45) Date of Patent: Jul. 13, 2004

(54) REEL TYPE PIPELINE LAYING SHIP AND METHOD

(75) Inventor: Lyle Stockstill, Belle Chasse, LA (US)

(73) Assignee: Torch Offshore, Inc., Gretna, LA (US)

( * ) Notice: Subject to any disclaimer, the term of this patent is extended or adjusted under 35 U.S.C. 154(b) by 48 days.

(21) Appl. No.: 10/050,430

(22) Filed: Jan. 15, 2002

(65) Prior Publication Data

US 2003/0138297 A1 Jul. 24, 2003

(51) Int. Cl.$^7$ .................................................. F16L 1/12
(52) U.S. Cl. ........................ 405/166; 405/169; 405/170
(58) Field of Search ............................ 405/170, 169, 405/168.4, 168.3, 168.2, 168.1, 167, 166, 150, 154.1

(56) References Cited

U.S. PATENT DOCUMENTS

| | | | |
|---|---|---|---|
| 3,237,438 A | 3/1966 | Tesson | |
| 3,331,212 A | 7/1967 | Cox et al. | |
| 3,372,461 A | 3/1968 | Tesson | |
| 3,581,506 A | 6/1971 | Howard | |
| 3,680,342 A | 8/1972 | Mott et al. | |

(List continued on next page.)

FOREIGN PATENT DOCUMENTS

| | | |
|---|---|---|
| AU | 696337 B2 | 7/1996 |
| EP | 0302038 | 2/1989 |
| EP | 0507572 A1 | 7/1992 |
| EP | 1063163 A2 | 12/2000 |
| FR | 2447852 | 8/1980 |
| GB | 2046207 A | 11/1980 |
| GB | 2178129 A | 2/1987 |
| GB | 2199631 A | 7/1988 |
| GB | 2210673 A | 6/1989 |
| GB | 2287518 A | 9/1995 |
| GB | 2296956 A | 7/1996 |
| GB | 2302157 A | 1/1997 |
| GB | 2287297 B | 6/1997 |
| JP | 4-145818 | 5/1992 |
| RU | 2090433 | 9/1997 |
| SU | 715-431 | 2/1980 |
| WO | WO 95/25237 | 9/1995 |
| WO | WO 95/25238 | 9/1995 |
| WO | WO 96/27751 | 9/1996 |

*Primary Examiner*—Frederick L. Lagman
(74) *Attorney, Agent, or Firm*—Garvey, Smith, Nehrbass & Doody, L.L.C.; Brett A. North; Charles C. Garvey, Jr.

(57) ABSTRACT

A pipeline laying ship has a hull with a deck area and a moon pool that extends through the hull midships. The pipeline welding stations are provided on the deck in between the bow of the hull and the moon pool. A superstructure is positioned in front of the moon pool and extends upwardly from the deck. The superstructure includes a track that is comprised of a plurality of supports for supporting a pipeline to be launched to the seabed. The superstructure has upper and lower sections that are removable with respect to each other. The upper section pivots upon the lower section in the preferred embodiment. The superstructure lower section supports the welded pipeline as it is being fabricated in a first plane that includes a central longitudinal axis for the pipeline. The upper section supports the pipeline on a second plane that forms an acute angle with the first plane. A pipeline launching section is also supported by the superstructure and provides a straightener, tensioner and a clamping mechanism for supporting the pipeline. The launching section is positioned generally above the moon pool and is movable in an arcuate path that enables the launching section to be spaced laterally away from the pipeline as it is being fed to the lower section of the superstructure. The launch section is also movable, preferably pivoting about a horizontal axis for moving the launch section into an inclined, tilted orientation that is useful, for example, in launching pipelines in shallower water.

38 Claims, 10 Drawing Sheets

U.S. PATENT DOCUMENTS

| | | |
|---|---|---|
| 3,685,306 A | 8/1972 | Mott |
| 3,775,987 A | 12/1973 | Rochelle et al. |
| 3,945,580 A | 3/1976 | Veyrassat |
| 3,952,960 A | 4/1976 | Veyrassat |
| 3,982,402 A | 9/1976 | Lang et al. |
| 4,012,001 A | 3/1977 | Knox |
| RE29,591 E | 3/1978 | Lloyd |
| 4,112,695 A | 9/1978 | Chang et al. |
| 4,157,023 A | 6/1979 | Tisdale et al. |
| 4,165,571 A | 8/1979 | Chang et al. |
| 4,218,158 A | 8/1980 | Tesson |
| 4,230,421 A | 10/1980 | Springett et al. |
| 4,243,345 A | 1/1981 | Cha et al. |
| 4,260,287 A | 4/1981 | Uyeda et al. |
| 4,269,540 A | 5/1981 | Uyeda et al. |
| 4,274,799 A | 6/1981 | Tisdale, III et al. |
| 4,297,054 A | 10/1981 | Yenzer et al. |
| RE30,846 E | 1/1982 | Lang et al. |
| 4,340,322 A | 7/1982 | Springett et al. |
| 4,345,855 A | 8/1982 | Uyeda et al. |
| 4,353,515 A | 10/1982 | Weaver et al. |
| 4,448,568 A | 5/1984 | Gentry et al. |
| 4,454,999 A | 6/1984 | Woodruff |
| 4,486,123 A | 12/1984 | Koch et al. |
| 4,493,463 A | 1/1985 | Rivinius |
| 4,538,937 A | 9/1985 | Lynch |
| 4,558,971 A | 12/1985 | David |
| 4,591,294 A | 5/1986 | Foulkes |
| 4,594,871 A | 6/1986 | de Boer |
| 4,649,954 A | 3/1987 | Dunwoody |
| 4,659,253 A | 4/1987 | Jacobson |
| 4,687,376 A | 8/1987 | Recalde |
| 4,721,410 A | 1/1988 | Recalde |
| 4,723,874 A | 2/1988 | Recalde |
| 4,765,776 A | 8/1988 | Howson |
| 4,789,108 A | 12/1988 | Recalde |
| 4,802,794 A | 2/1989 | Lynch |
| 4,820,082 A | 4/1989 | Recalde |
| 4,913,080 A | 4/1990 | Kindem et al. |
| 4,961,671 A | 10/1990 | Recalde |
| 4,984,934 A | 1/1991 | Recalde |
| 4,992,001 A | 2/1991 | Harrison |
| 5,044,825 A | 9/1991 | Kaldenbach |
| 5,348,423 A | 9/1994 | Maloberti et al. |
| 5,413,434 A | 5/1995 | Stenfert et al. |
| 5,421,675 A | 6/1995 | Brown et al. |
| 5,527,134 A | 6/1996 | Recalde |
| 5,533,834 A | 7/1996 | Recalde |
| 5,573,353 A | 11/1996 | Recalde |
| 5,590,915 A | 1/1997 | Recalde |
| 5,630,678 A | 5/1997 | Branchut et al. |
| 5,718,538 A | 2/1998 | Recalde |
| 5,823,712 A | 10/1998 | Kalkman et al. |
| 5,836,719 A | 11/1998 | Martin et al. |
| 5,947,641 A * | 9/1999 | Martin .................... 405/168.1 |
| 5,971,666 A | 10/1999 | Martin et al. |
| 5,975,802 A | 11/1999 | Willis |
| 5,986,236 A | 11/1999 | Gainand et al. |
| 6,004,071 A | 12/1999 | Broeder et al. |
| 6,056,478 A | 5/2000 | Martin et al. |
| 6,089,489 A | 7/2000 | Cruickshank |
| 6,149,347 A | 11/2000 | Scott |
| 6,361,250 B1 | 3/2002 | de Varax |
| 6,371,794 B1 | 4/2002 | Bauer et al. |
| 6,554,538 B2 * | 4/2003 | Stockstill ................. 405/168.3 |

* cited by examiner

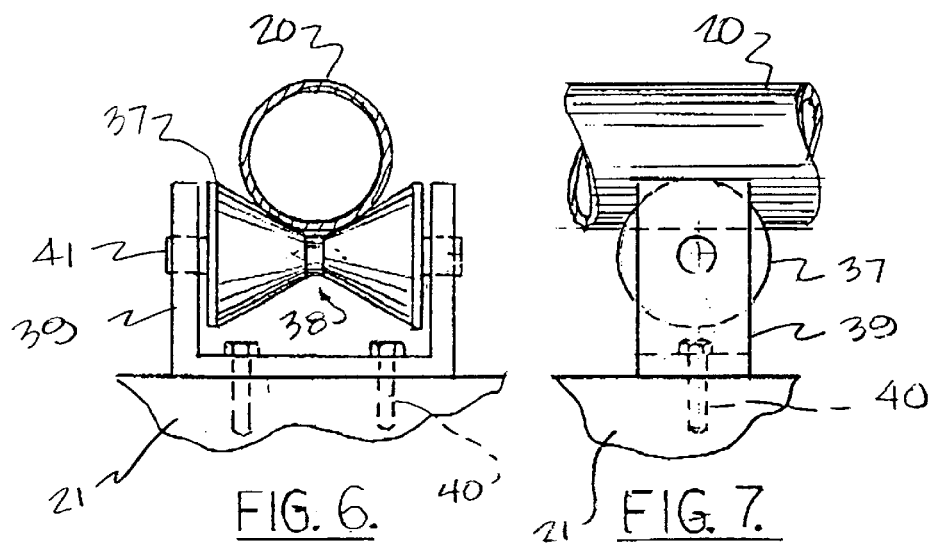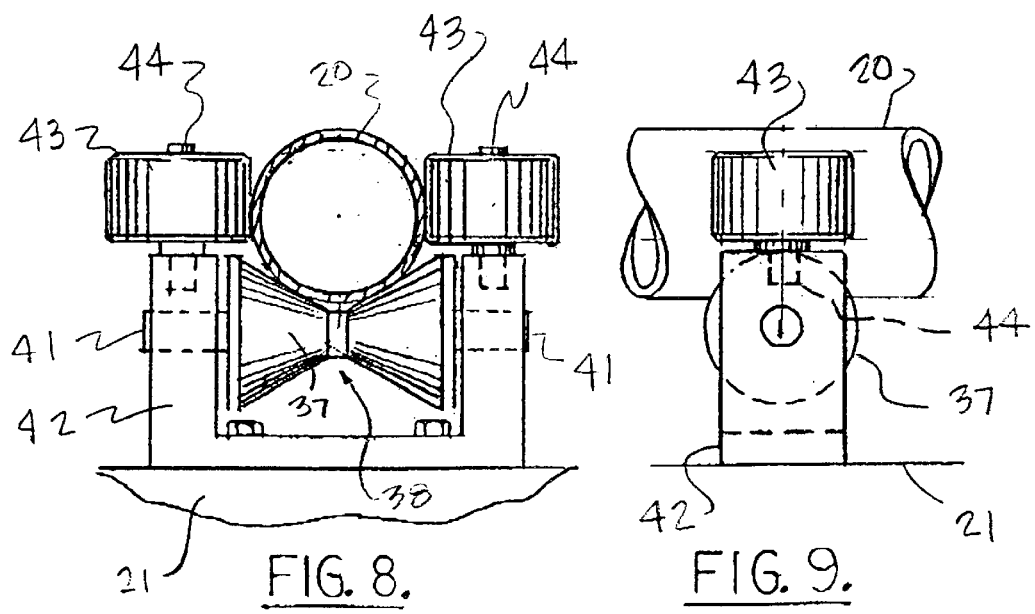

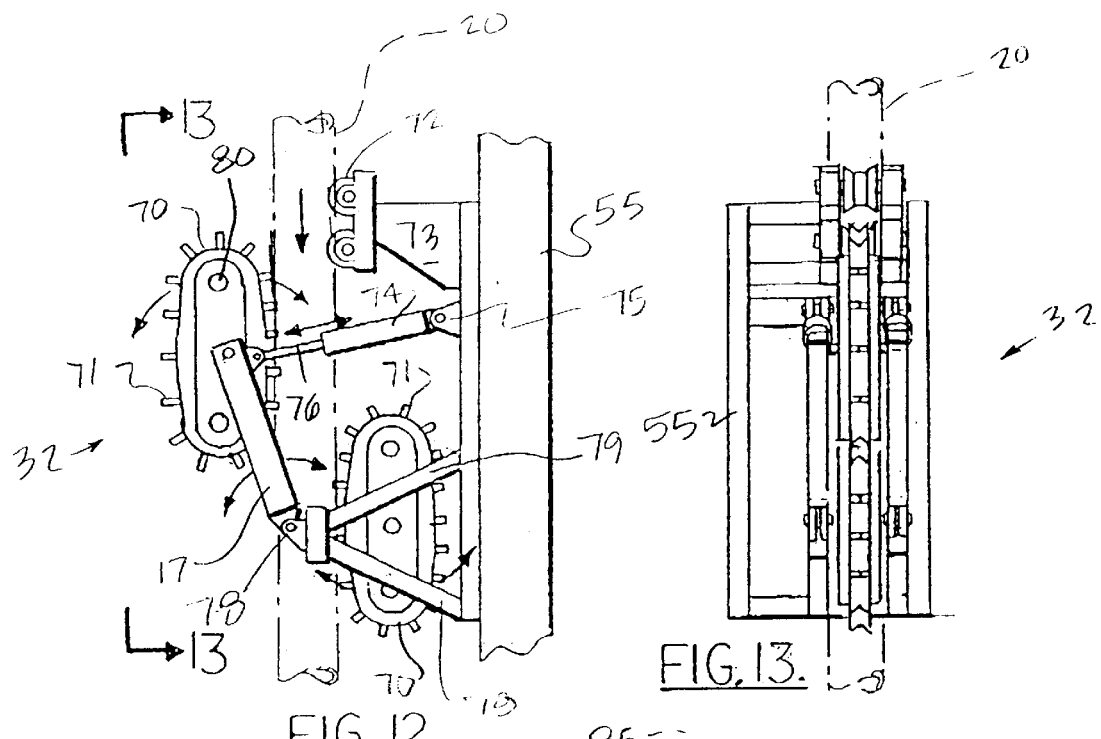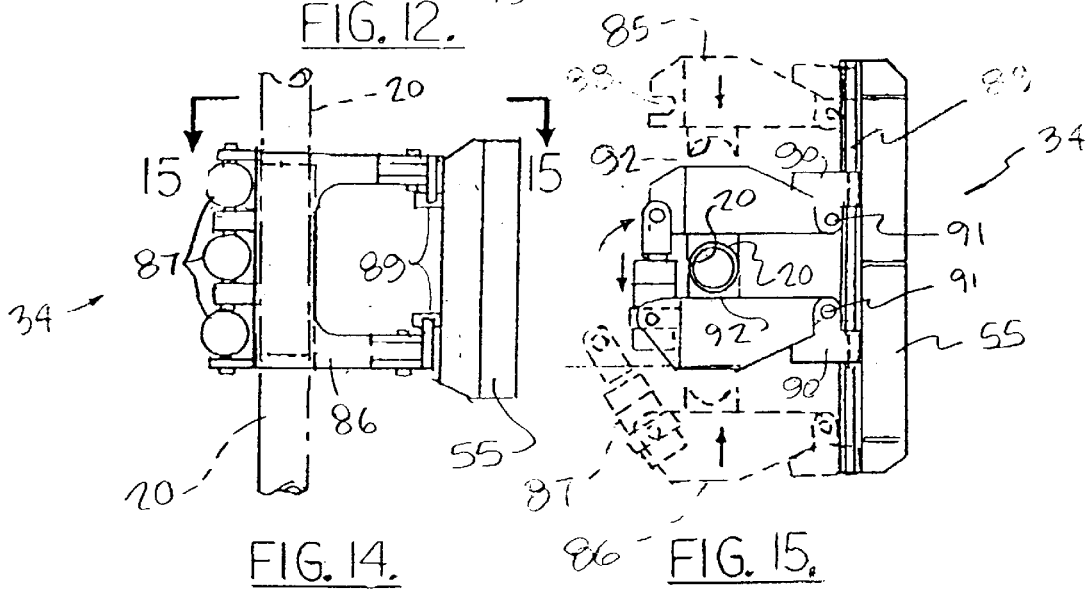

REEL TYPE PIPELINE LAYING SHIP AND METHOD

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the placement of pipelines in a marine environment. More particularly, the present invention relates to an improved method and apparatus for laying a pipeline in a marine environment, wherein a specially configured pipeline laying ship provides a hull with a deck featuring a pipeline support truss that has a lower fixed section, an upper pivoting section and a launch section. A pipeline fabricating "firing line" fabricates a pipeline that is routed to the support truss as it is constructed. The launch section is provided for directing the pipeline from the support truss to tensioning and straightening stations and then preferably through a moon pool in the hull to the seabed.

2. General Background of the Invention

For many years, pipelines have been fabricated at sea and lowered to the seabed at a desired location. For example, early patents to Tesson include U.S. Pat. Nos. 3,237,438 and 3,372,461 that are directed to a pipeline laying barge and method of operation. In the Tesson patents, the joints of pipe are welded on deck and then spooled or wound upon a reel. At a desired location, the pipeline is then placed on the seabed by unwinding the pipe from the reel and straightening it before it is lowered to the seabed.

A tilting tower has also been used to lower a pipeline to the seabed as the pipeline is being unwound from a reel. An example of such a titling tower and reel pipeline laying arrangement can be seen in the Uveda U.S. Pat. No. 4,345,855 as an example. A similar arrangement is seen in the Springett U.S. Pat. No. 4,340,322. The Uveda U.S. Pat. No. 4,345,855 and the Springett U.S. Pat. No. 4,340,322 are hereby incorporated herein by reference. Another method of laying a pipeline is through the use of a stinger. A stinger is simply an elongated boom structure that extends from usually one end of a hull or barge. The stinger supports the pipeline as it is being lowered to the seabed. Examples of the use of stingers can be seen us U.S. Pat. Nos. RE28,922, RE29,591 and 5,533,834.

Reel type pipeline laying systems are typically employed in deep water situations. While it is known to weld the pipeline joints on the deck of a vessel and wind them upon a reel (for example, see the above discussed Tesson patents), it is also known to weld the pipeline on shore and then wind it upon the reel before the ship leaves port.

The following table provides an exemplary listing of patents that are known to applicant and that relate to pipeline laying vessels and methods of operation:

| MARINE PIPE LAYING PATENTS | | |
|---|---|---|
| PAT. NO. | TITLE | INVENTOR |
| 3,237,438 | Pipe Line Laying Barge | Tesson |
| 3,372,461 | Method of Laying Pipeline | Tesson |
| Re.28,922 | Column Stabilized Stinger | Lloyd, III |
| 3,982,402 | Submarine Pipeline Laying Vessel | Lang et al. |
| Re.29,591 | Column Stabilized Stinger Transition Segment And Pipeline Supporting Apparatus | Lloyd |
| 4,112,695 | Sea Sled For Entrenching Pipe | Chang et al. |
| 4,165,571 | Sea Sled With Jet Pump For Underwater Trenching And Slurry Removal | Chang et al. |
| 4,218,158 | Pipe Handling Method And Apparatus | Tesson |
| 4,230,421 | Self Propelled Dynamically Positioned Reel Pipe Laying Ship | Springett et al. |
| 4,260,287 | Portable Reel Pipelaying Method | Uyeda et al. |
| 4,268,190 | Pipe Handling Method And Apparatus | Tesson |
| 4,269,540 | Self Propelled Dynamically Positioned Reel Pipe Laying Ship | Uyeda et al. |
| 4,297,054 | Method of Laying Offshore Pipeline From a Reel Carrying Vessel | Yenzer et al. |
| 30,846 | Submarine Pipeline Laying Vessel | Lang et al. |
| 4,340,322 | Self Propelled Dynamically Positioned Reel Pipe Laying Ship | Springett et al. |
| 4,345,855 | Self Propelled Dynamically Positioned Reel Pipe Laying Ship | Uyeda et al. |
| 4,486,123 | Underwater Pipe Laying Vessel | Koch et al. |
| 4,687,376 | Multi-Reel Operational Lines Laying Vessel | Recalde |
| 4,721,411 | Multi-Reel Operational Lines Laying Vessel | Recalde |
| 4,723,874 | Multi-Reel Operational Lines Laying Vessel | Recalde |
| 4,765,776 | Convertible Barge | Howson |
| 4,789,108 | Multi-Reel Operational Lines Laying Vessel | Recalde |
| 4,820,082 | Pipeline Laying System And Vessel | Recalde |
| 4,917,540 | Pipeline Laying System And Vessel With Pipeline Straightening And Tensioning Device | Recalde |
| 4,961,671 | Method of Converting a Pipeline Laying Vessel From a Pivotal Ramp Type To An Arcuate Type | Recalde |
| 4,984,934 | Pipeline Laying System And Vessel And Method of Spooling Lines Onto The Vessel | Recalde |
| 5,044,825 | Method And Installation For Laying a Pipeline | Kaldenbach |
| 5,413,434 | Method And Installation For Laying a Pipeline | Stenfert et al. |
| 5,527,134 | Pipelaying Vessel | Recalde |
| 5,533,834 | Pipelay Stinger | Recalde |
| 5,836,719 | Pipe Laying Vessel and Method | Martin et al. |
| 5,971,666 | Pipe Laying Vessel | Martin et al. |
| 5,975,802 | Pipeline Laying Apparatus | Willis |
| 6,004,071 | Methods of Installing Elongate Underwater Structures | Broeder et al. |
| PATENT | TITLE | ISSUED |
| WO9525238A1 | Pipe Laying Vessel and Method | Sep. 21, 1995 |
| WO9525237A1 | Pipe Laying Vessel and Method | Sep. 21, 1995 |
| AU1898395A1 | Pipe Laying Vessel and Method | Oct. 03, 1995 |
| AU1898295A1 | Pipe Laying Vessel and Method | Oct. 03, 1995 |
| AU4088796A1 | Pipeline Laying | Jul. 25, 1996 |
| AU676431B2 | Pipe Laying Vessel and Method | Mar. 06, 1997 |
| AU681014B2 | Pipe Laying Vessel and Method | Aug. 14, 1997 |
| AU696337B2 | Pipeline Laying | Sep. 10, 1998 |
| BR9507088A | Processo Para Assentar Uma Tubulacao Submarina E Embarcacao Para Ser Utilizada No Assentamento De Uma Tubulacao Submarina | Sep. 16, 1997 |
| BR9507064A | Processo Para Assentar Uma Tubulacao Submarina E Embarcacao Para Ser Utilizada No AssentamentoDe Uma Tubulacao Submarina | Oct. 14, 1997 |

-continued

| | | |
|---|---|---|
| BR9600055A | Sistema De Colocacao De Tubos Navio Conduzindo Um Sistema De Colocacao De Tubos E Processo Colocacao De Uma Tubulacao De Um Navio | Jan. 21, 1998 |
| GB2287518B | Pipe Laying Vessel and Method | Mar. 12, 1997 |
| GB2287518A | Pipe Laying | Sep. 20, 1995 |
| GB2296956B2 | | Mar. 10, 1999 |
| GB2296956B | Pipeline | Mar. 10, 1999 |
| GB2296956A1 | | Jul. 17, 1996 |
| GB2296956A | Pipeline Laying with Bending and Straightening | Jul. 17, 1996 |
| GB2302157B | Pipe Laying Vessel and Method | Nov. 12, 1997 |
| GB2302157A | Pipe Laying Vessel and Method | Jan. 08, 1997 |
| GB9411702A0 | | Aug. 03, 1994 |
| GB9500664A0 | | Mar. 8, 1995 |
| GB9505344A | Pipe Laying Vessel and Method | May 03, 1995 |
| GB9600005A0 | | Mar. 06, 1996 |
| GB9600005A | Pipeline Laying | Mar. 06, 1996 |
| GB9619167A | Pipe Laying Vessel and Method | Oct. 23, 1996 |
| NO960135A0 | Roerlednings-leggesystem | Jan. 11, 1996 |
| NO960135A | Roerlednings-leggesystem | Jul. 15, 1996 |
| NO963858A0 | Roerleggingsfartoey Og Fremgangsmaate | Sep. 13, 1996 |
| NO963858A | Roerleggingsfartoey Og Fremgangsmaate | Nov. 11, 1996 |
| NO963857A0 | Roerleggingsfartoey Og Fremgangsmaate | Sep. 13, 1996 |
| NO963857A | Roerleggingsfartoey Og Fremgangsmaate | Nov. 11, 1996 |

General Discussion of the Present Invention

The present invention provides an improved pipeline laying vessel and its method of operation. The method employs a dynamically positioned barge or self-propelled dynamically positioned reel ship. The ship has a hull with a deck area that enables pipe joints to be welded together to form a pipeline. Joints of pipe are placed in a storage area on the deck of a vessel in suitable pipe racks. Welding stations near this storage area are arranged to receive multiple joints of pipe that have been internally cleaned and prepared for welding. Part of this preparation can include, for example, end bevels that are applied to each pipe joint.

As pipeline fabrication proceeds, pipe joints are moved from the rack storage areas to the pipeline fabrication area, also referred to herein as the "firing line."

This fabrication area or "firing line" can comprise essentially a set of rollers supporting the pipeline along the preferably horizontal center line of the fabrication area. Welding equipment (manual or automatic) can be provided together with known weld preparation tools.

The incoming pipe joints are aligned with the pipeline being fabricated. The welded area between the pipe joints and the joints previously welded together can be adjusted as required. The pipe joints are progressively welded together to form a pipeline at multiple welding stations. The welds are tested and field joints are then coated at another work station located in the pipeline fabrication area.

When one or more joints of pipe have been welded together end-to-end on the firing line, the assembled pipeline is routed through a pipe bender to a support truss. The pipeline moves ahead in the pipeline fabrication area by the same distance, e.g. 40 foot increments.

Once bent to a desired curvature by the pipe bender, the pipeline tracks upon a lower section of the truss support. Tension can be adjusted depending on the various pipe laying parameters such as pipeline characteristics (e.g. diameter, wall thickness, coating, alloy, wet or dry lay)and water depth during lay operations. The support truss has upper and lower sections. The lower section is a base section with feet that rest upon the ship hull deck, preferably in front of the moon pool. The pipeline being welded is fed to the lower section as the pipeline is welded, joints of pipe being added one at a time. The pipeline being welded has a generally horizontal, longitudinally extended axis. The lower section of the support truss preferably tracks a plane that is occupied by the axis of the pipeline. A curved track or ramp is provided on the lower section of the truss. After leaving the pipe bender, the bent pipeline is supported by the curved ramp on the lower truss section. The curved ramp on the lower truss section terminates at a pivotal connection located at the front, upper corner of the lower truss section.

An upper truss section is pivotally attached to the lower truss section at a rotary bearing. The upper truss section has a curved ramp that is of a generally semicircular shape. The ramp begins next to the rotary bearing. The end of the curved ramp of the lower truss section is positioned just below the rotary bearing. The rotary bearing has a central opening that enables the pipeline to travel from the curved ramp of the lower truss section, through the central opening of the rotary bearing and then to the curved ramp of the upper truss section.

The curved ramp of the upper truss section begins at the front of the upper truss section and ends near the rear of the upper truss section that connects to the launch section. The launch section of the truss support is pivotally attached to the upper truss section so that the launch section can be inclined a desired orientation (eg. vertical or up to 35 degrees from vertical).

The proper tilting of the launch section and the coordination of the tension in the pipeline being launched with the ship as it moves along the pipeline route ensure that the stresses in the pipeline are maintained within predetermined, predefined acceptable limits.

On the launch section, an area in between the tensioner and the clamping mechanism or "hold off" clamp can be a work station that can be used to support the pipeline and install corrosion anodes and insulation coating when required on the pipeline joints that are welded in the pipeline fabrication area or "firing line," or in the tower itself. The work station can be used to initiate the pipeline, lay down, and install testing devices at the beginning and the end of the pipeline lay operations.

DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is a fragmentary end view of the preferred embodiment of the apparatus of the present invention and illustrating the pipe roller and support;

FIG. 7 is a fragmentary side view of the preferred embodiment of the apparatus of the present invention, illustrating the pipe roller and support;

FIGS. 8–9 are end and side views showing an alternate construction of the pipe roller;

FIG. 12 is a partial elevation view of the preferred embodiment of the apparatus of the present invention illustrating the straightener;

FIG. 13 is a side view taken along lines 13—13 of FIG. 12;

FIG. 14 is a fragmentary elevation view of the preferred embodiment of the apparatus of the present invention showing the clamp mechanism;

FIG. 15 is a top view taken along lines 15—15 of FIG. 14;

DETAILED DESCRIPTION OF THE INVENTION

Figure 1:
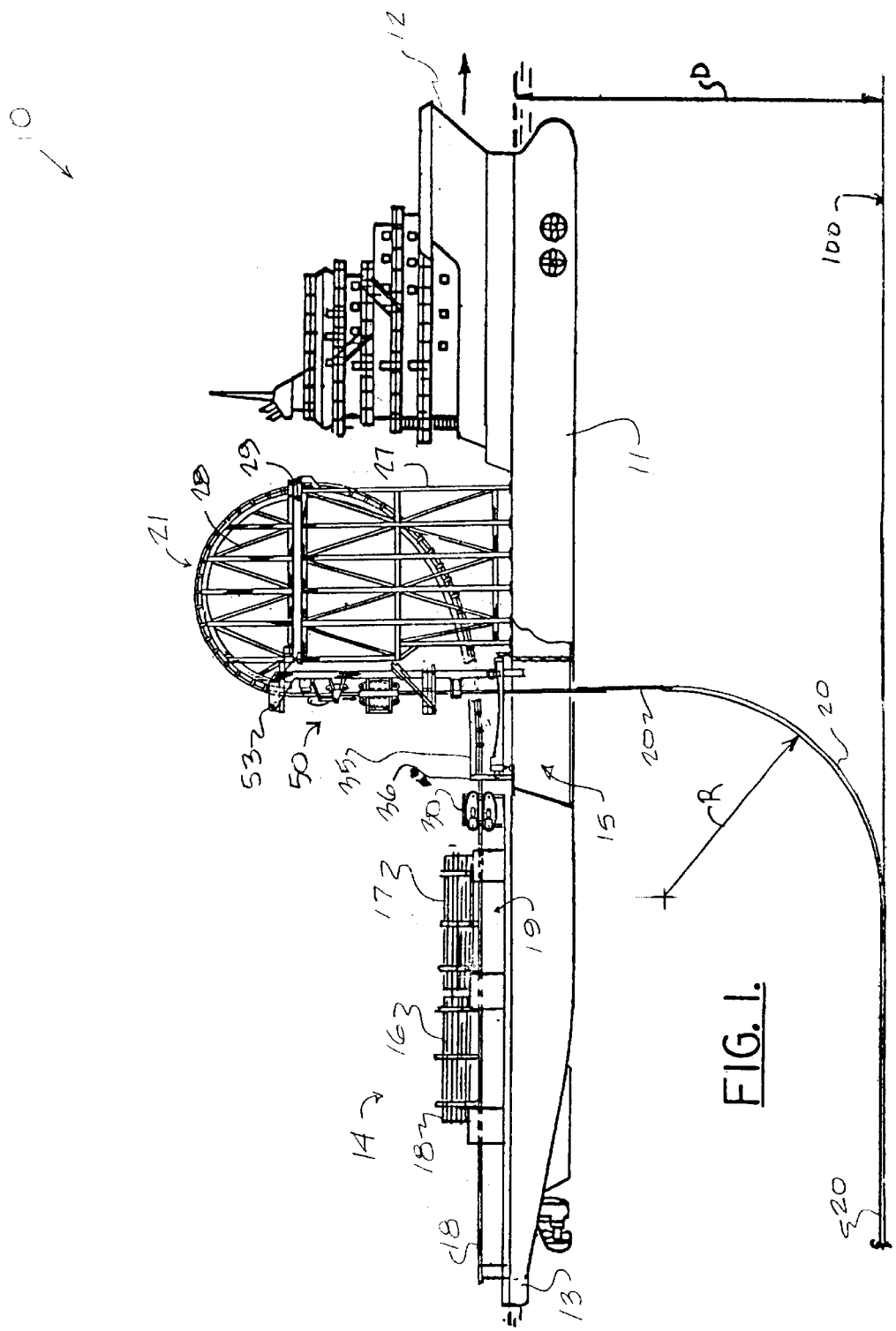
FIG. 1 is a side elevation view showing the preferred embodiment of the apparatus of the present invention and illustrating the method of the present invention.
Figure 5:
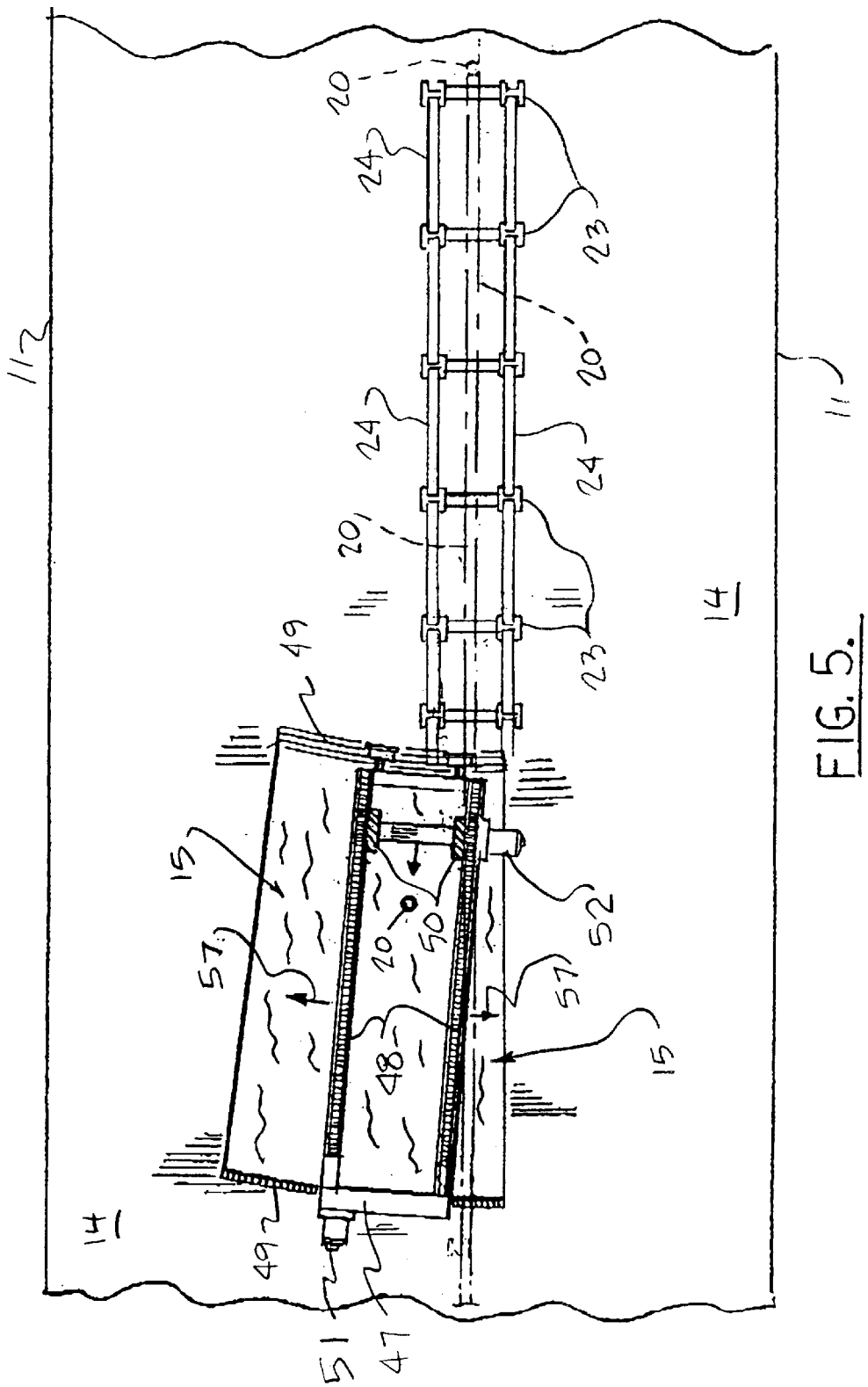
FIG. 5 is a partial sectional view of the preferred embodiment of the apparatus of the present invention taken along lines 5—5 of FIG. 3.

In FIG. 1, the preferred embodiment of the apparatus of the present invention is designated generally by the numeral 10. Pipe laying vessel 10 has an elongated hull 11 with bow 12 and stern 13 end portions. Hull 11 provides deck 14. Moon pool opening 15 extends from the deck 14 through the hull amidships as shown in FIGS. 1 and 5. In the preferred embodiment, a pipeline 20 is fabricated on deck 14 and launched through moon pool opening 15.

The deck 14 preferably has pipe storage racks 16 and 17 for storing a plurality of pipe joints 18. One or more welding stations 19 can be provided on deck 14 next to pipe storage racks 16, 17. In this fashion, joints of pipe 18 can be welded together end to end to form a pipeline 20 that is to be placed upon seabed 100.

A pipeline support 21 (see FIGS. 1–2) preferably extends upwardly from deck 14 of hull 11. The pipeline support 21 is preferably in the form of a truss 21 which has a plurality of feet 22 that are supported by the hull 11 at deck 14. The pipeline support truss 21 preferably includes a lower static section 27 and an upper pivoting section 28. The upper and lower sections 27, 28 are preferably connected at pivotal connection 29.

Figure 2:
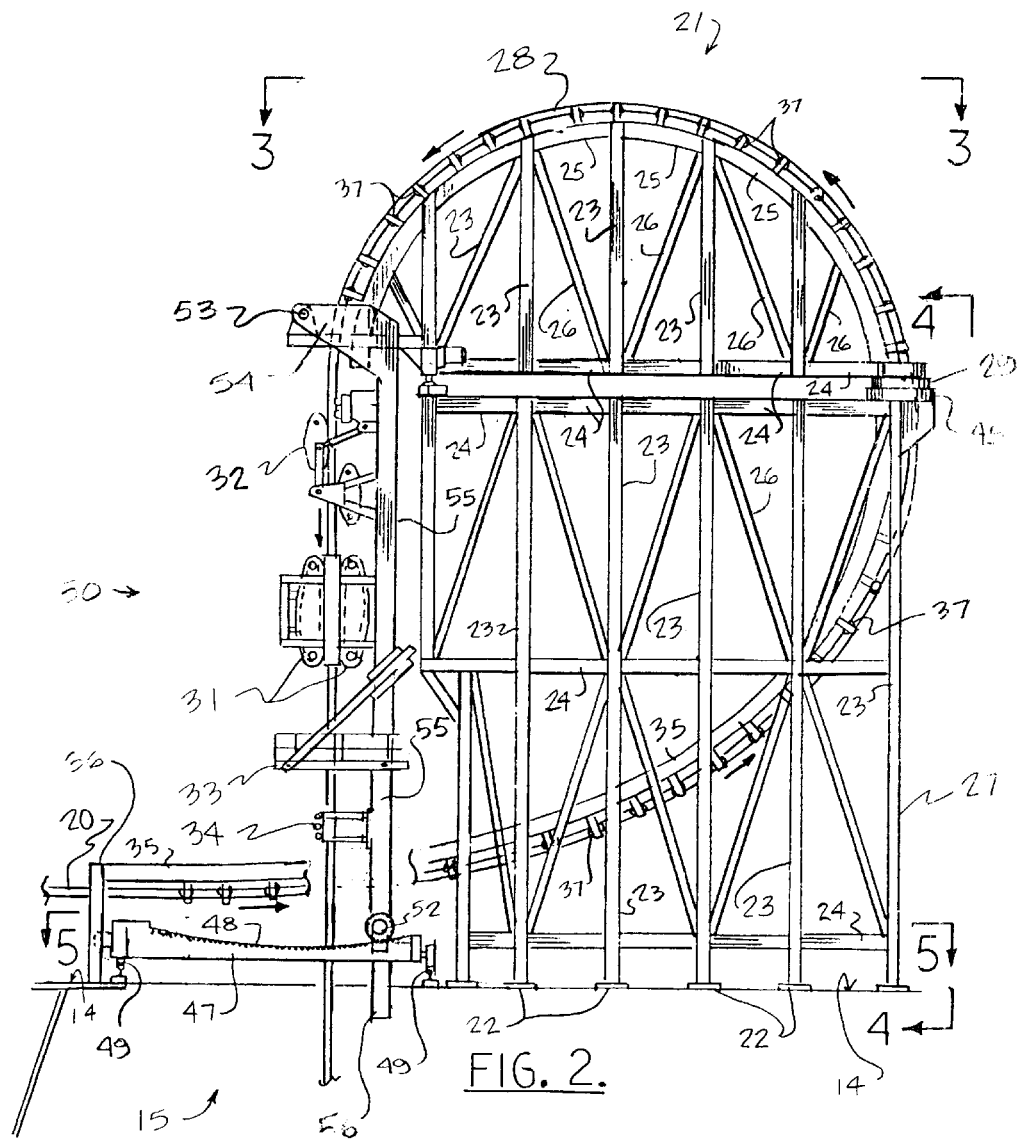
FIG. 2 is a partial side elevation of the preferred embodiment of the apparatus of the present invention showing the support truss and moon pool.

The pipeline support truss 21 can be comprised of a plurality of vertical members 23, horizontal members 24, and diagonal members 26. An upper curved ramp 25 is supported by the upper pivoting section 28. A lower curved ramp 35 is supported by the lower section 27 of pipeline support truss 21. A support 36 located at the back of the moon pool opening preferably 15 supports one end portion of ramp 35 as shown in FIGS. 1 and 2. During pipe laying operations, the ramps 25, 35 receive and support pipeline 20 as it travels upon support truss 21.

When a pipeline 20 is to be fabricated, a number of joints of pipe 18 are welded together end to end at welding stations 19 near pipe racks 16, 17. As the joints of pipe 18 are welded together, they are fed to ramp 35, as best shown in FIG. 1. Before reaching ramp 35, the pipeline 20 is received by pipe bender 30 that bends the pipeline 20 in an arcuate shape that enables the pipeline 20 to easily track the curvature of ramp 35. At pivotal connection 29, a rotary bearing 45 can be provided with an opening 46 that the pipeline 20 can pass through (see FIGS. 2 and 3). Once the pipeline 20 passes through the opening 46, it is not bent any further. The pipeline 20 traverses over rollers and upon the upper section 28 of truss 21 and curved ramp 25.

The pipeline 20 can be supported by a plurality of rollers when it travels along the curved ramps 25, 35 in the direction indicated by the arrow in FIG. 2. Various roller arrangements are shown in FIGS. 6–9. A preferred roller arrangement for supporting the pipeline 20 as it travels along the pipeline support truss 21 and ramps 25, 35 is shown in FIGS. 6 and 7. In FIG. 6, an hour glass shaped pipe roller 37 provides a recess 38 that receives pipeline 20. The roller 37 is preferably supported upon roller support 39 having a roller shaft 41. Fasteners 40 such as bolted connections can be used to secure the roller support 39 to pipeline support truss 21. A welded connection could also be used to attach roller support 39 to pipeline support truss 21.

In FIGS. 8 and 9, an alternate roller arrangement for supporting the pipeline 20 upon truss 21 is shown. In FIG. 8, a larger roller support 42 is provided that supports not only the hour glass shaped roller 37, but also lateral support rollers 43. The lateral support rollers 43 are mounted upon roller shafts 44 that attach to roller support 42 as shown in FIGS. 8 and 9.

Depending from the upper section 28 of pipeline support truss 21 is launch section 50. Launch section 50 preferably includes a downwardly extending frame 55 that is pivotally connected at its upper end 54 to truss upper section 28 at pivotal connection 53. At its lower end portion 56, frame 55 is preferably supported by a moving frame 47. The frame 47 preferably has a concave toothed rack 48 that moves along an arcuate path as shown in FIG. 5, schematically indicated by arrow 57. The frame 47 travels upon curved tracks 49 that are provided on deck 14 at positions fore and aft of moon pool opening 15 as shown in FIG. 5. This arrangement enables the lower end 56 of frame 55 to be moved between port and starboard positions as indicated schematically by arrows 57 when the upper section 28 is pivoted about bearing 45. This arrangement enables a part of pipeline 20 to be launched toward the seabed through the moon pool opening 15 at a selected position that is spaced away from the part of the pipeline 20 first engaging ramp 35. This offset can be seen in FIG. 5 wherein the pipeline 20 entering the moon pool opening 15 appears in transverse section and in the form of a generally circular shape.

Figure 3:
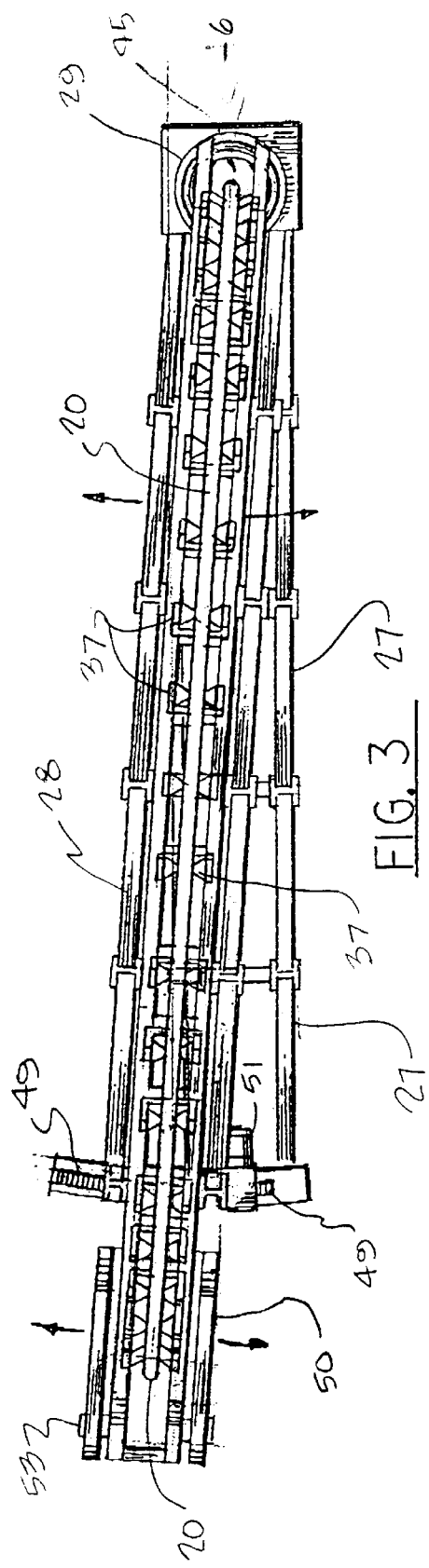
FIG. 3 is a plan view of the preferred embodiment of the apparatus of the present invention taken along lines 3—3 of FIG. 2.
Figure 4:
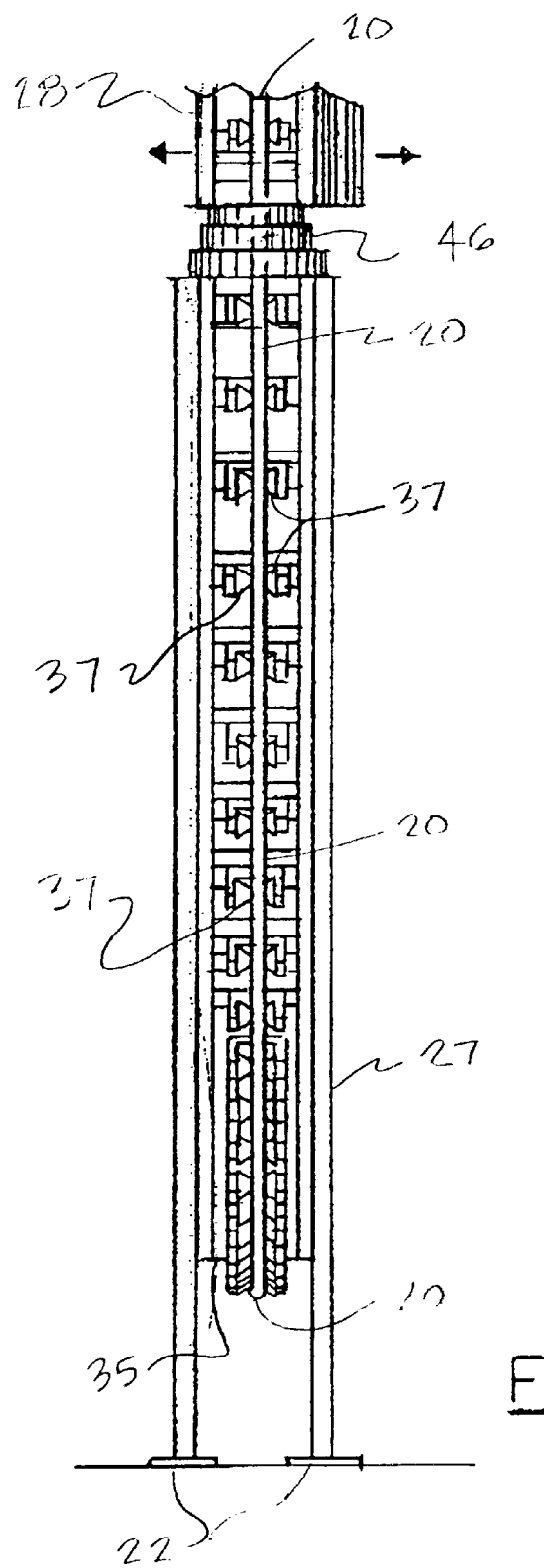
FIG. 4 is a partial sectional view of the preferred embodiment of the apparatus of the present invention taken along lines 4—4 of FIG. 3.

Motor drives can be used to pivot the upper section 28 relative to lower section 27. In FIGS. 3 and 5, these motor drives are indicated by the numeral 51.

Figure 17:
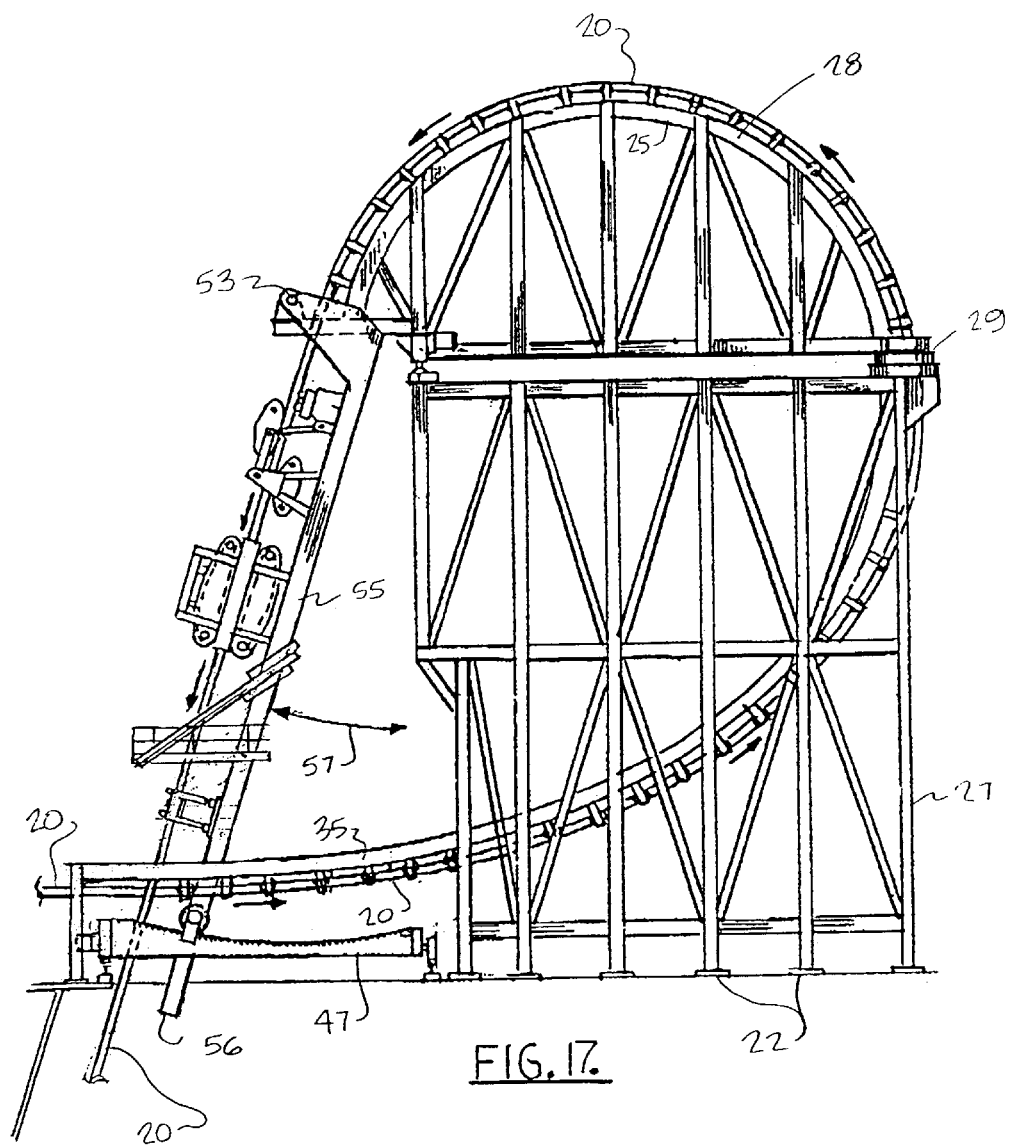
FIG. 17 is a partial elevation view showing the pipe support truss with the launch section in an inclined position.

Motor drives can also be used to tilt launch section 50. In FIGS. 2 and 17, the motor drive that tilts launch section 50 is indicated by the numeral 52. In FIG. 2, the motor drive has positioned the launch section 50 in a generally vertical position indicated by the vertical orientation of the portion of pipeline 20 that is being launched toward the seabed. In FIG. 17, the motor drive 52 has pivoted the launch section 50 about pivotal connection 53 to an inclined position as indicated schematically by the arrow 58. Such a position can be used when laying a pipeline in shallow water.

The launch section 50 PREFERABLY provides pipe straightener 32, pipe tensioner 31, work station 33, and clamping mechanism 34. For each of these stations, it should be understood that there could be variations in the configuration of the tensioner 31, straightener 32, work station 33, and clamping mechanism 34. An exemplary construction for the components 31 (tensioner), 32 (straightener), and 34 (clamping mechanism) are shown in FIGS. 10–15.

Figure 10:
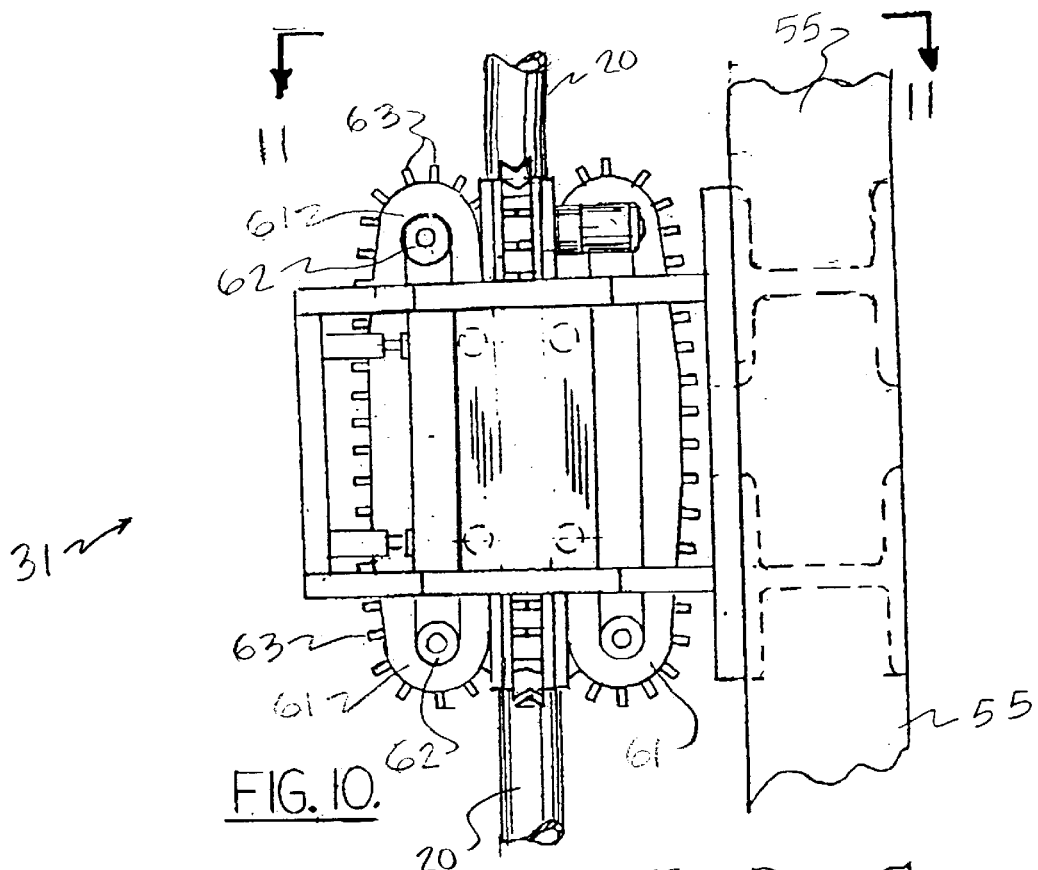
FIG. 10 is a partial elevation view of the preferred embodiment of the apparatus of the present invention.
Figure 11:
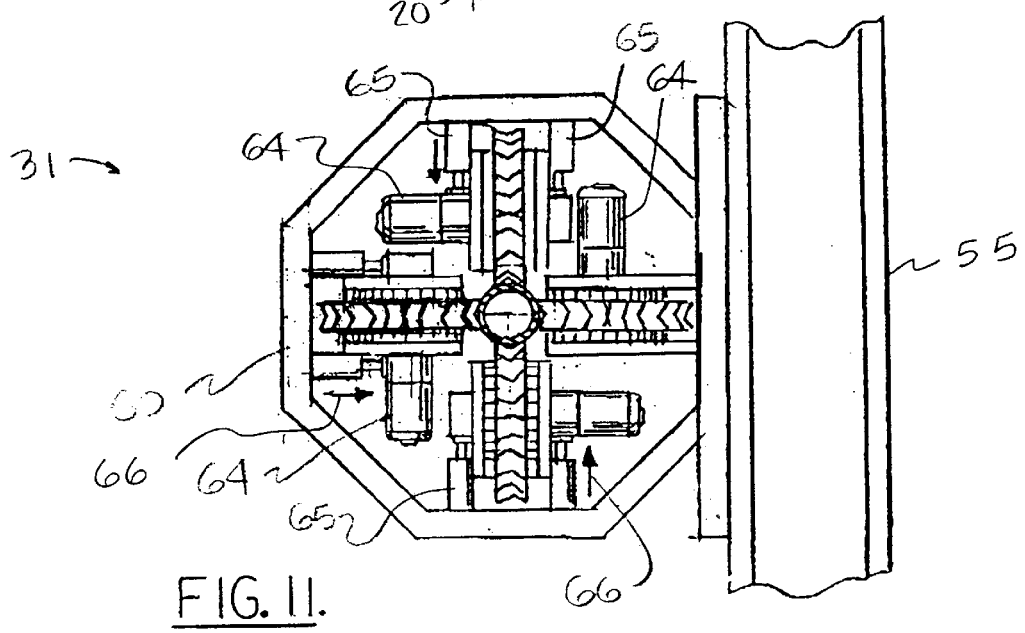
FIG. 11 is a fragmentary top view taken along lines 11—11 of FIG. 10.
Figure 16:
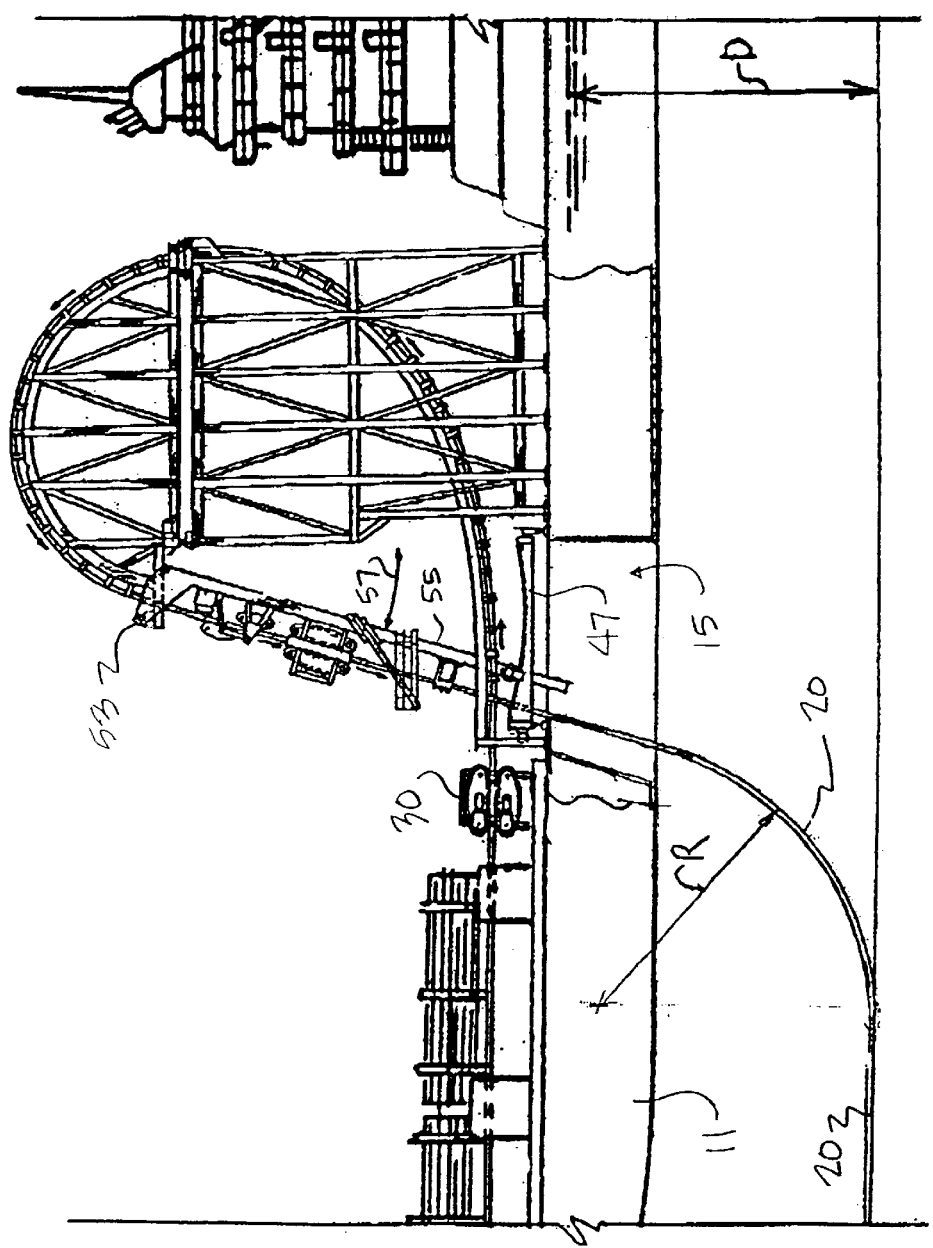
FIG. 16 is a partial elevation view of the preferred embodiment of the apparatus of the present invention showing the launch section of the support truss in an inclined position.

As shown in FIGS. 10 and 11, tensioner 31 preferably includes a housing 60 that supports a plurality of endless belts 61, each of the endless belts having a pair of opposed rotary bearings 62. Pipe grippers 63 are preferably mounted on each of the endless belts 61. The grippers 63 are shaped to engage and grip the pipeline 20. Motor drives 64 can be used to rotate the rotary bearings 62 and thus move the endless belts 61 in a selected direction. Hydraulic cylinders 65 can be used to apply pressure to the endless belts 61 for pushing the grippers 63 into tight engagement with the pipeline 20. As the pipeline 20 passes through the straightener 31, hydraulic energy can be applied through the cylinder 65 to the gripper 63. The tensioners 30 and 31 combine to provide the pipeline top tension. The straightener 32 straightens the pipeline. In FIG. 11, arrows 66 schematically indicate the application of pressure by cylinder 65.

FIGS. 12 and 13 show straightener 32. Straightener 32 preferably includes two endless belt devices 70, one mounted to cylinder support frame 79 and the other to lever arm 77. Pipe grippers 71 are attached to each of the endless belt devices 70 as shown in FIGS. 12 and 13. As the pipeline 20 passes through the straightener 32, it is first engaged by support rollers 72 mounted upon roller support 73. A hydraulic cylinder 74 is mounted to frame 55 at padeye 75. Hydraulic cylinders 74 have extensible pushrods 76 that can be used to move the lever arms 77 about pivotal connection 78. Arms 77 can move the endless belt 70 attached to arm 77 toward the pipeline 20. Through the application of pressure using cylinder 74, the pipeline 20 is straightened as it passes through the area in between roller 72, and the pair of opposed endless belts 70.

In FIGS. 14 and 15, the clamping mechanism 34 is shown. Clamping mechanism 34 includes clamp members 85, 86 that are opposed and positioned during use on opposite sides of the pipeline 20. Clasp members 87 can be used to engage recess portions 88 on clamp members 85, 86 to form a closure. The clamp members 85, 86 are moved upon rails 89 that are attached, welded, for example, to frame 55. A pivotal connection 91 is provided in between frame 55 and clamp members 85, 86. Pivotal connection 91 is provided on clamp supports 90 that ride upon rails 89.

Each clamp member 85, 86 has a semicircular recess portion 92 that is configured to fit and engage the pipe 20 during use as shown in FIG. 15.

PARTS LIST

| Part Number | Description |
| --- | --- |
| 10 | pipe laying vessel |
| 11 | hull |
| 12 | bow |
| 13 | stern |
| 14 | deck |
| 15 | moon pool opening |
| 16 | pipe storage rack |
| 17 | pipe storage rack |
| 18 | pipe joint |
| 19 | welding station |
| 20 | pipeline |
| 21 | pipeline support truss |
| 22 | feet of truss 21 |
| 23 | vertical member of truss 21 |
| 24 | horizontal member of truss 21 |
| 25 | upper curved ramp |
| 26 | diagonal member of truss 21 |
| 27 | lower section of truss 21 |
| 28 | upper section of truss 21 |
| 29 | pivotal connection |
| 30 | pipe bender |
| 31 | pipe tensioner |
| 32 | pipe straightener |
| 33 | work station |
| 34 | clamping mechanism |
| 35 | lower curved ramp |
| 36 | support for lower curved ramp 35 |
| 37 | pipe roller |
| 38 | recess |
| 39 | roller support |
| 40 | fastener |
| 41 | roller shaft |
| 42 | roller support |
| 43 | lateral support roller |
| 44 | roller shaft |
| 45 | rotary bearing of pivotal connection 29 |
| 46 | opening of rotary bearing 45 |
| 47 | moving frame |
| 48 | concave toothed rack of frame 47 |
| 49 | curved track |
| 50 | launch section |
| 51 | motor drive |
| 52 | motor drive |
| 53 | pivotal connection |
| 54 | upper end of frame 55 |
| 55 | frame of launch section 50 |
| 56 | lower end of frame 55 |
| 57 | arrow |
| 58 | arrow |
| 60 | housing of tensioner 31 |
| 61 | endless belt tensioner 31 |
| 62 | rotary bearing of endless belt 61 |
| 63 | pipe gripper |
| 64 | motor drive |
| 65 | hydraulic cylinder |
| 66 | arrow |
| 70 | endless belt device |
| 71 | pipe gripper |
| 72 | roller |
| 73 | roller support |
| 74 | hydraulic cylinder |
| 75 | padeye |
| 76 | pushrod of cylinder 74 |
| 77 | lever arm |
| 78 | pivotal connection |
| 79 | cylinder support frame |
| 80 | pivot |
| 85 | clamp member |
| 86 | clamp member |
| 87 | clasp member |
| 88 | recess |
| 89 | rail |
| 90 | clamp support |
| 91 | pivot connection |
| 92 | recess |
| 100 | seabed |

The foregoing embodiments are presented by way of example only; the scope of the present invention is to be limited only by the following claims.

What is claimed is:

1. A pipeline laying ship 10 comprising:

a) a hull 11 having bow and stern end portions, a deck 14, and a moon pool opening 15 that extends through the hull 11;

b) the deck 14 including a pipe storage rack 16 and 17 that contains joints of pipe 18 to be welded together;

c) one or more pipeline welding stations 19 on the deck 14, the pipeline welding stations 19 being positioned to join said joints of pipe 18 together along a generally longitudinal axis to form an elongated pipeline 20;

d) a pipe bender 30 for receiving and bending the pipeline 20 to form an arcuate shape;

e) a pipeline support extending upwardly from the deck and including a plurality of roller supports 39, the pipeline support 21 having upper 28 and lower 27 sections, the lower section 27 being a static section supported by the deck 14 and the upper section 28 being movably attached to the lower section 27; and f) wherein the pipeline support 21 lower section 27 supports the pipeline 20 in a first plane that includes said longitudinal axis and the arcuate shaped portion of the pipeline in the lower section;

g) the upper section 28 supporting the pipeline 20 in a second plane that forms an acute angle with the first plane;

h) the pipeline support 21 having a pipeline launch section 50 that has a pipe straightener 32 and a pipe tensioner 31 positioned generally above the moon pool opening; and i) wherein the pipeline being fabricated travels sequentially through the welding stations pipe bender, lower section of pipeline support, upper section of pipeline support, launch section, moon pool opening and the seabed.

2. The pipeline laying ship of claim 1 wherein the upper section is rotatable relative to the lower section.

3. The pipeline laying ship of claim 1 wherein the upper section has a generally semicircular portion that supports the pipeline in a generally semicircular shape.

4. The pipeline laying ship of claim 1 wherein the upper section has an entry and an exit, the pipeline tracking a generally curved path between the entry and the exit.

5. The pipeline laying ship of claim 1 wherein the upper section is rotatable about a generally vertical axis.

6. The pipeline laying ship of claim 1 wherein the superstructure is positioned in between the bow and the moon pool.

7. The pipeline laying ship of claim 1 wherein at least one of the welding stations is in between the stern and the moon pool.

8. The pipeline laying ship of claim 1 wherein the launching section is movable into multiple inclined angular orientations that enable the pipeline to be launched through the moon pool a selected launch angle.

9. The pipeline laying ship of claim 1 wherein the superstructure has a plurality of rollers that interface the pipeline with the superstructure.

10. The pipeline laying ship of claim 1 wherein the pipeline moves continuously away from the moon pool on the lower section of the superstructure.

11. The pipeline laying ship of claim 1 wherein the pipeline moves continuously toward the stern of the hull on the upper section of the superstructure.

12. The pipeline laying ship of claim 1 wherein the pipeline is only elastically bent in the lower section of the superstructure.

13. The pipeline laying ship of claim 1 wherein the pipeline is only elastically bent in the upper section of the superstructure.

14. The pipeline laying ship of claim 1 wherein the pipeline reverses direction on the superstructure, starting in a forward direction and ending in a rearward direction.

15. A pipe laying ship comprising:

a) a hull having a deck having a bow, a stern and a moon pool opening amidships;

b) one or more pipeline welding stations on the deck, the pipeline welding stations being positioned to weld joints of pipe together to form a pipeline on the deck of the hull, the pipeline having a generally horizontal axis;

c) pipeline support means on the deck of the vessel for holding the pipeline as it passes sequentially through first and second static curved pipe support paths, the first curved path defining a first plane that includes said generally horizontal axis and the second curved path defining a second plane the forms an acute angle with the first plane; and d) low friction means on the support means for forming a low friction interface between the pipeline and the support means as the pipeline travels upon the support means to the moon pool for launching to the seabed.

16. The pipeline laying apparatus of claim 15 wherein the welding stations are in between the moon pool and the hull stern.

17. The pipeline laying apparatus of claim 15 wherein the low friction means includes a plurality of rollers attached to the support means.

18. A method of laying a pipeline on a seabed, comprising the steps of:

a) progressively joining together lengths of pipe upon the deck of a vessel along a generally linear axis that generally tracks the vessel deck to form a long pipeline, the vessel having a bow, stern, moon pool amidships and a support structure comprised of upper and lower static support sections next to the moon pool;

b) providing a guiding track for supporting the pipeline on the support structure, the track having a first curved path defining a first plane that includes said axis and a second plane that defines a second curved path;

c) bending the pipeline to approximate the curvature of the guiding track in step "b";

d) lowering the pipeline from the support structure to the seabed and through the moon pool.

19. The method of claim 18 further comprising the step of passing the pipeline through a tensioner.

20. A method of laying a pipeline on a seabed, comprising the steps of:

a) progressively joining together lengths of pipe upon the deck of a vessel along a generally linear axis that generally tracks the vessel deck to form a long pipe line, the vessel having a bow, stern, moon pool amidships and a support structure comprised of upper and lower static support sections next to the moon pool;

b) providing a guiding track for supporting the pipeline on the support structure, the track having a first curved path defining a first plane that includes said axis and a second plane that defines a second curved path;

c) bending the pipeline to approximate the curvature of the guiding track in step "b";

d) lowering the pipeline from the support structure to the seabed and through the moon pool; and e) wherein the support structure includes upper and lower sections, the upper section rotating about an inclined to form said acute angle said planes defining an acute angle.

21. The method of claim 20 wherein in step "a" the upper static support section is rotatable relative to the lower static support section.

22. The method of claim 20 wherein the upper static support section has a generally semicircular portion and further comprising supporting the pipeline in a generally semicircular shape.

23. The method of claim 20 wherein the upper static support section has an entry and an exit, and further comprising the step of tracking the pipeline along a generally curved path between the entry and the exit.

24. The method of claim 20 further comprising rotating the upper static section about a generally vertical axis to a selected angular position.

25. The method of claim 20 wherein the support structure is positioned in between the bow and the moon pool.

26. The method of claim 20 wherein the joining of stop "a" is conducted at welding stations in between the stern and the moon pool.

27. The method of claim 20 further comprising moving the launching section into multiple inclined angular orientations that enable the pipeline to be launched through the moon pool at a selected launch angle.

28. The method of claim 20 further comprising using a plurality of rollers to interface the pipeline with the support structure.

29. The method of claim 20 further comprising moving the pipeline continuously away from the moon pool on the lower section of the support structure.

30. The method of claim 20 further comprising moving the pipeline continuously toward the stern of the hull on the upper section of the support structure.

31. The method of claim 20 further comprising elastically bending the pipeline only in the lower static section.

32. The method of claim 20 further comprising elastically bending the pipeline only in the upper section of the support structure.

33. The method of claim 20 further comprising reversing direction of the pipeline on the support structure, the pipeline starting in a forward direction and ending in a rearward direction.

34. The method of claim 20 further comprising positioning the moon pool behind the support structure.

35. The method of claim 20 wherein the support structure has an inclined portion and further comprising and straightening the pipeline on the support structure.

36. The method of claim 20 further comprising continuously moving the pipeline away from the moon pool on the lower section of the support structure.

37. The method of claim 20 further comprising moving the pipeline toward the stern of the hull on the upper section of the support structure.

38. The method of claim 20 further comprising in step "a" providing welding stations for joining lengths of pipe between the moon pool and the hull stern.

* * * * *